United States Patent [19]
Kubo et al.

[11] Patent Number: 5,477,512
[45] Date of Patent: Dec. 19, 1995

[54] DETECTION APPARATUS FOR DETECTING SECTOR MARKS OF OPTICAL DISK AND OPTICAL DISK ACCESS APPARATUS

[75] Inventors: Mitumasa Kubo, Kodaira; Kiyoshi Shidara, Kawagoe, both of Japan

[73] Assignee: Teac Corporation, Tokyo, Japan

[21] Appl. No.: 403,080

[22] Filed: Mar. 13, 1995

Related U.S. Application Data

[62] Division of Ser. No. 150,216, Nov. 10, 1993, Pat. No. 5,432,762.

[30] Foreign Application Priority Data

Nov. 12, 1992 [JP] Japan ..................... 4-302598
Nov. 12, 1992 [JP] Japan ..................... 4-302599

[51] Int. Cl.$^6$ ..................................................... G11B 7/00
[52] U.S. Cl. ............................. 369/32; 369/47; 369/58; 369/44.26
[58] Field of Search ............................ 369/58, 54, 47, 369/48, 49, 32, 44.26, 275.3

[56] References Cited

U.S. PATENT DOCUMENTS

| | | | |
|---|---|---|---|
| 5,128,916 | 7/1992 | Ito et al. ................... | 369/44.26 |
| 5,206,847 | 4/1993 | Kanda . | |
| 5,210,733 | 5/1993 | Yamaguchi et al. . | |
| 5,235,576 | 8/1993 | Shigemoni ................. | 369/44.26 X |
| 5,297,131 | 3/1994 | Tanaka ...................... | 369/44.26 X |
| 5,315,568 | 5/1994 | Dente et al. . | |

FOREIGN PATENT DOCUMENTS 64-13263  1/1989  Japan .

*Primary Examiner*—Georgia Y. Epps
*Assistant Examiner*—Muhammad N. Edun
*Attorney, Agent, or Firm*—Michael N. Meller

[57] ABSTRACT

A sector mark detection apparatus detects a sector mark added to an arbitrary sector of an optical disk when seeking the arbitrary sector, where the optical disk has a predetermined recording format in which a predetermined number of sectors are arranged on the optical disk. The sector mark detection apparatus is provided with a gate signal generating circuit for generating a predetermined number of gate signals at predetermined intervals based on timings between pulse signals which are read from the optical disk, a mark length generating circuit for generating mark length data related to lengths of the sector marks from the read pulse signals based on the timings, a counter circuit for measuring widths of the gate signals by counting at a predetermined frequency and for outputting counted values, a matching circuit for comparing the counted values and match data and for outputting a matched result, and a judging circuit for judging the sector mark of the arbitrary sector based on the mark length data and the matching result.

5 Claims, 9 Drawing Sheets

DETECTION APPARATUS FOR DETECTING SECTOR MARKS OF OPTICAL DISK AND OPTICAL DISK ACCESS APPARATUS

This is a division of application Ser. No 150,216 filed Nov. 10, 1993, now U.S. Pat. No. 5,432,762.

BACKGROUND OF THE INVENTION

The present invention generally relates to sector mark detection apparatuses and optical disk access apparatuses, and more particularly to a sector mark detection apparatus which detects sector marks recorded on an optical disk and an optical disk access apparatus which uses a sector mark detection apparatus.

Conventionally, in recording mediums such as optical disks on which information can be recorded and reproduced therefrom, an address signal is recorded to indicate an address on a track of the optical disk. The address signal is recorded on the tracks in regions which are called sectors and are formed to predetermined lengths at predetermined intervals. A sector mark is added to a head of each sector, and an access to a desired sector on the optical disk is made by detecting the sector mark. The sector mark is determined by standards such as the standard decided by the European Computer Manufacturers Association (ECMA).

FIGS. 1 and 2 are diagrams for explaining examples of the conventional sector mark detection circuits.

In the sector mark detection circuit shown in FIG. 1, signals which are included in an input signal IN and have predetermined patterns are respectively detected in pattern detectors 11 and 12, and output detection signals of the pattern detectors 11 and 12 are respectively input to delay circuits 13 and 14. The delay circuits 13 and 14 supply to a threshold value circuit 15 delayed signals after predetermined times. The threshold value circuit 15 outputs a signal which indicates that the sector mark has been detected if a number of times the delayed signals match the output detection signal of the pattern detector 11 exceeds a threshold value.

On the other hand, in the sector mark detection circuit shown in FIG. 2, the delay circuits and the like shown in FIG. 1 are simplified. In other words, the input signal IN is once input to a shift register 16, sampled by a clock CLK with which a sufficient resolution can be obtained, and output to a matching circuit 17 as parallel output signals "a". The matching circuit 17 determines whether or not each of the sampled values match a predetermined pattern, and supplies to a threshold value circuit 18 signals b1 through b5 which indicate the results of the matching. If the majority of the signals b1 through b5 indicating the match is greater than or equal to a threshold value, the threshold value circuit 18 outputs a signal which indicates that the sector mark has been detected.

The sector mark detection circuits shown in FIGS. 1 and 2 are described in a Japanese Laid-Open Patent Application No. 64-13263.

However, in the optical disk which is recorded according to the MCAV (Modified Constant Angular Velocity) system, a reference clock used for the recording and reproduction differs depending on the zone (or region) of the optical disk and the reference clock signal frequency becomes higher towards the outer periphery of the optical disk. For this reason, problems occur when detecting the sector marks of such an optical disk by sampling the sector marks within zones having an unknown data rate at the same sampling frequency using the sector mark detection circuits shown in FIGS. 1 and 2. More particularly, it is necessary to provide a number of matching patterns corresponding to the number of zones and to provide delay times of each of the delay circuits in the case of the sector mark detection circuit shown in FIG. 1. On the other hand, it is necessary to provide a number of matching values equal to the number of zones and corresponding to each of the sector marks in the case of the sector mark detection circuit shown in FIG. 2.

Therefore, there were problems in that the circuit construction of the sector mark detection circuit becomes complex, and that the sampling frequency must be set to an extremely high frequency in order to distinguish the zones from the matching values.

SUMMARY OF THE INVENTION

Accordingly, it is a general object of the present invention to provide a novel and useful sector mark detection apparatus and an optical disk access apparatus in which the problems described above are eliminated.

Another and more specific object of the present invention is to provide a sector mark detection apparatus which detects a sector mark added to an arbitrary sector of an optical disk when seeking the arbitrary sector, where the optical disk has a predetermined recording format in which a predetermined number of sectors are arranged on the optical disk, and the sector mark detection apparatus comprises gate signal generating means for generating a predetermined number of gate signals at predetermined intervals based on timings between pulse signals which are read from the optical disk, mark length generating means, coupled to the gate signal generating means, for generating mark length data related to lengths of the sector marks from the read pulse signals based on the timings, counter means, coupled to the gate signal generating means, for measuring widths of the gate signals by counting at a predetermined frequency and for outputting counted values, matching means, coupled to the counter means, for comparing the counted values and match data and for outputting a matched result, and judging means, coupled to the matching means, for judging the sector mark of the arbitrary sector based on the mark length data and the matching result. According to the sector mark detection apparatus of the present invention, the widths of the gate signals which are generated from the input signal read from the optical disk are measured by counting at the predetermined frequency, and the sector marks are distinguished based on a comparison of the counted values and the matching data. As a result, it is possible to detect the sector marks with a high resolution using a simple construction and a low frequency signal.

Still another object of the present invention is to provide an optical disk access apparatus which makes access to an arbitrary position on an optical disk having a predetermined recording format in which sectors added with sector marks are arranged in a predetermined number of zones so that a number of the sectors differs depending on the zone, comprising holding means for holding match data corresponding to the sector marks in the zones of the optical disk for each of the zones, sector mark detection means, coupled to the holding means, for comparing signals read from the optical disk and the match data and for detecting the sector mark of each of the zones, discriminating means, coupled to the sector mark detection means, for discriminating the zone to which the detected sector mark belongs, and frequency generating means, coupled to the discriminating means, for outputting a clock having a frequency which corresponds to the discriminated zone so that the access to the arbitrary position is possible in response to the clock. According to the optical disk access apparatus of the present invention, the match data corresponding to the sector marks of each of the zones are held for each of the zones, and the sector marks are detected by comparing the signal read from the optical disk and the match data of each of the zones. In addition, the zones are discriminated based on the detected sector marks, and the recording or reproducing operation of the drive is started by a clock frequency of the discriminated zone. Hence, it is possible to simultaneously detect the sector mark and discriminate the zone. Therefore, it is possible to reduce the access time to a desired position of the optical disk using a simple construction.

Other objects and further features of the present invention will be apparent from the following detailed description when read in conjunction with the accompanying drawings.

DESCRIPTION OF THE PREFERRED EMBODIMENTS

Figure 1:
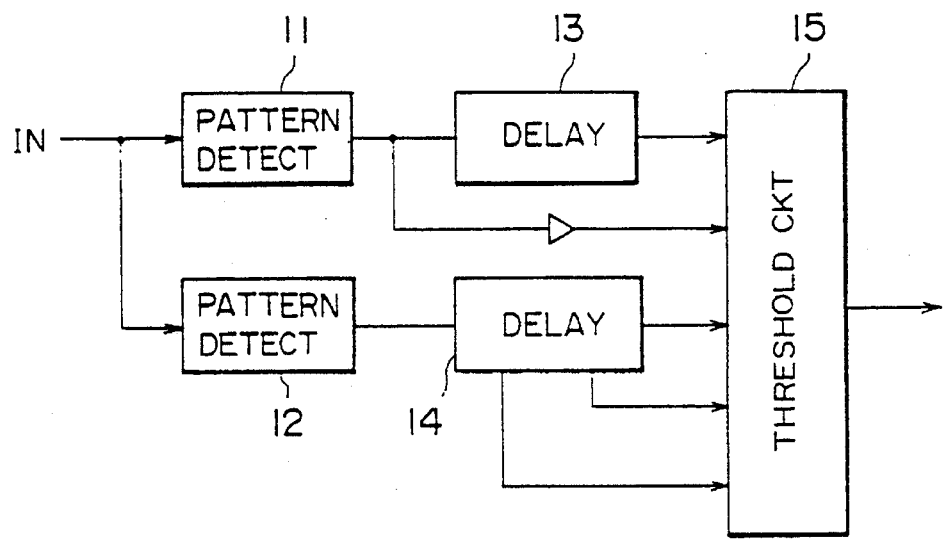
FIG. 1 is a system block diagram showing an example of a conventional sector mark detection circuit.
Figure 2:
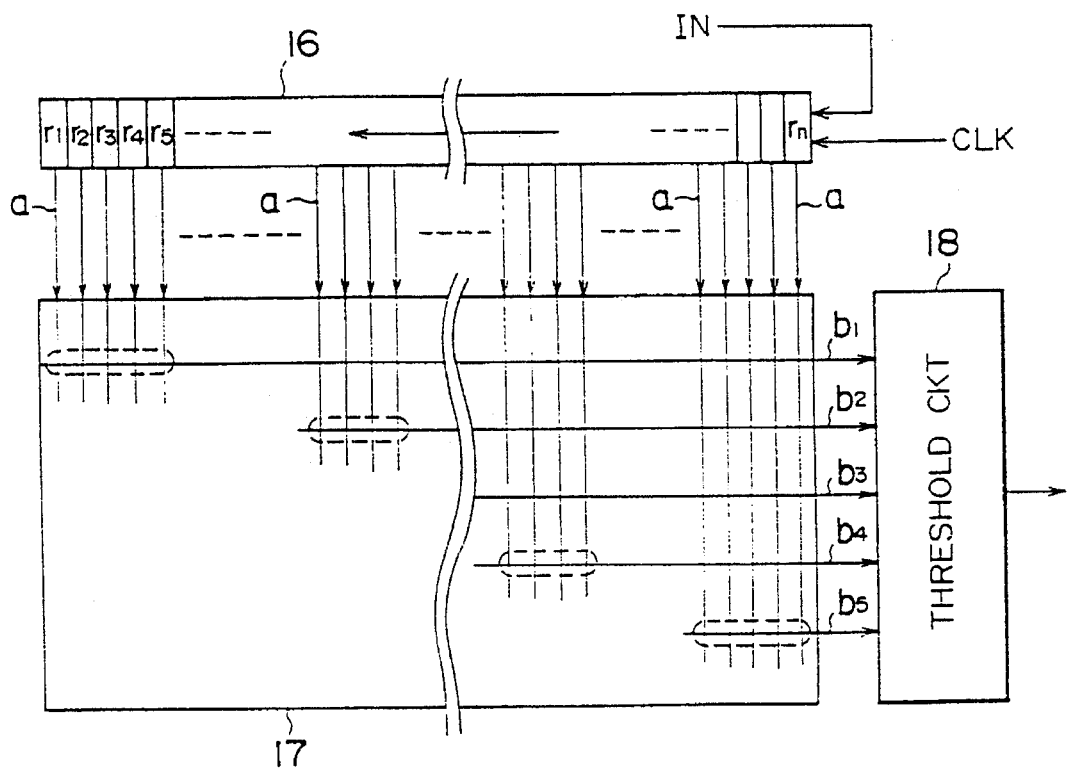
FIG. 2 is a system block diagram showing another example of the conventional sector mark detection circuit.
Figure 3:
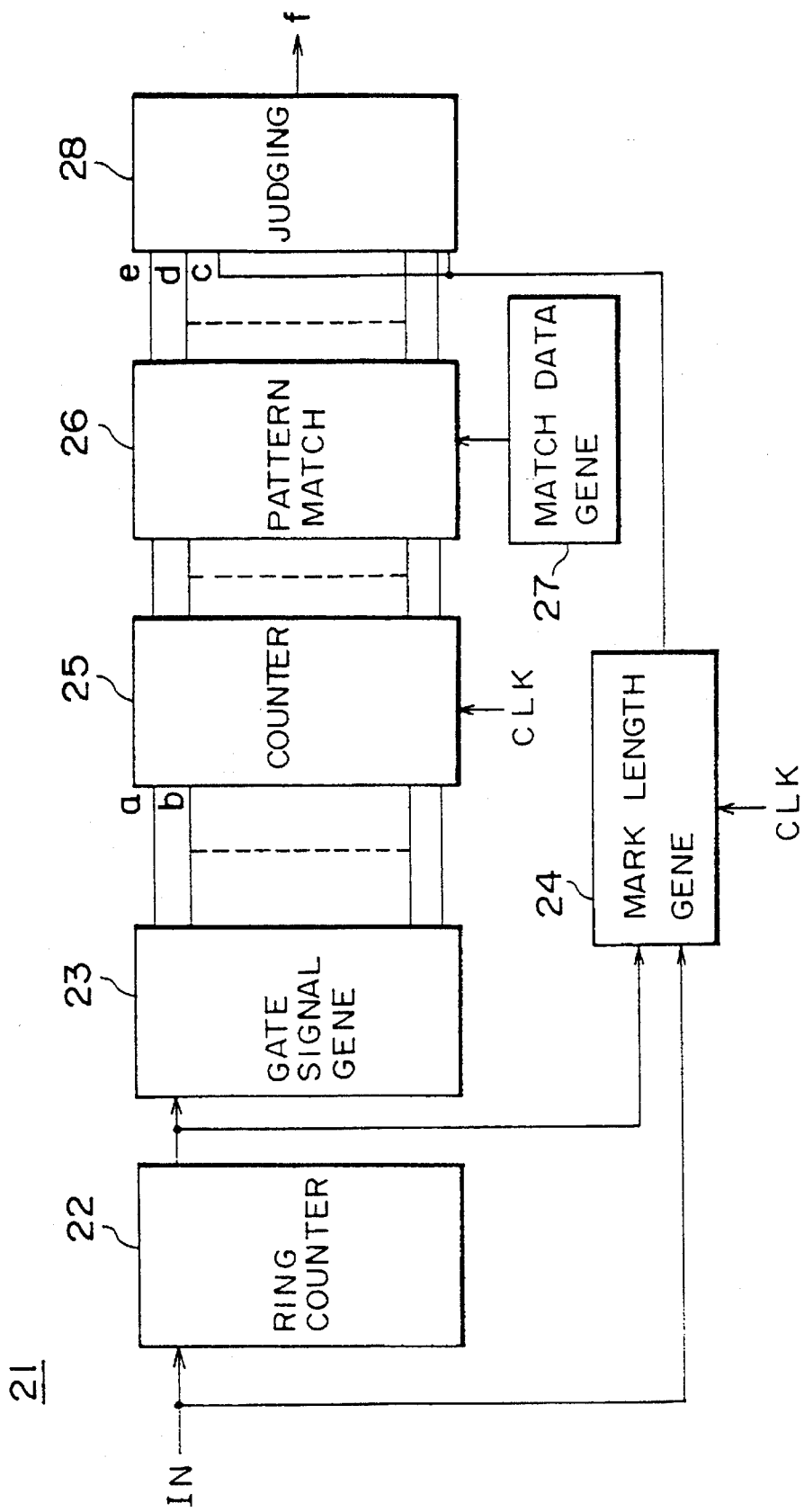
FIG. 3 is a system block diagram showing an embodiment of a sector mark detection apparatus according to the present invention.

FIG. 3 shows an embodiment of a sector mark detection apparatus according to the present invention. In this embodiment, it is assumed for the sake of convenience that a recording medium used is an optical disk employing the MCAV system, and that sectors added with a sector mark are recorded in a plurality of zones so that the number of sectors differs along a radial direction of the optical disk.

A sector mark detection apparatus 21 shown in FIG. 3 includes a ring counter 22, a gate signal generating circuit 23, a mark length generating circuit 24, a counter circuit 25, a pattern matching circuit 26, a match data generating circuit 27, and a judging circuit 28 which are connected as shown. The ring counter 22 and the gate signal generating circuit 23 form a gate signal generating means, and the mark length generating circuit 24 forms a mark length generating means.

The counter circuit 25 forms a counter means, and the pattern matching circuit 26 and the match data generating circuit 27 form a matching means. The judging circuit 28 forms a judging means.

The mark length generating circuit 24 samples an input signal IN and an output of the ring counter 22 by a clock CLK, and generates mark length data indicative of the entire length of the sector mark. This mark length data is supplied to the judging circuit 28. The gate signal generating circuit 23 generates gate signals based on the output of the ring counter 22, and the counter circuit 25 counts the output gate signals of the gate signal generating circuit 23 by the clock CLK. The match data generating circuit 27 generates match data of counted patterns corresponding to the sector marks of each of the zones (areas) on the optical disk (not shown), and supplies the match data to the pattern matching circuit 26.

Figure 4:
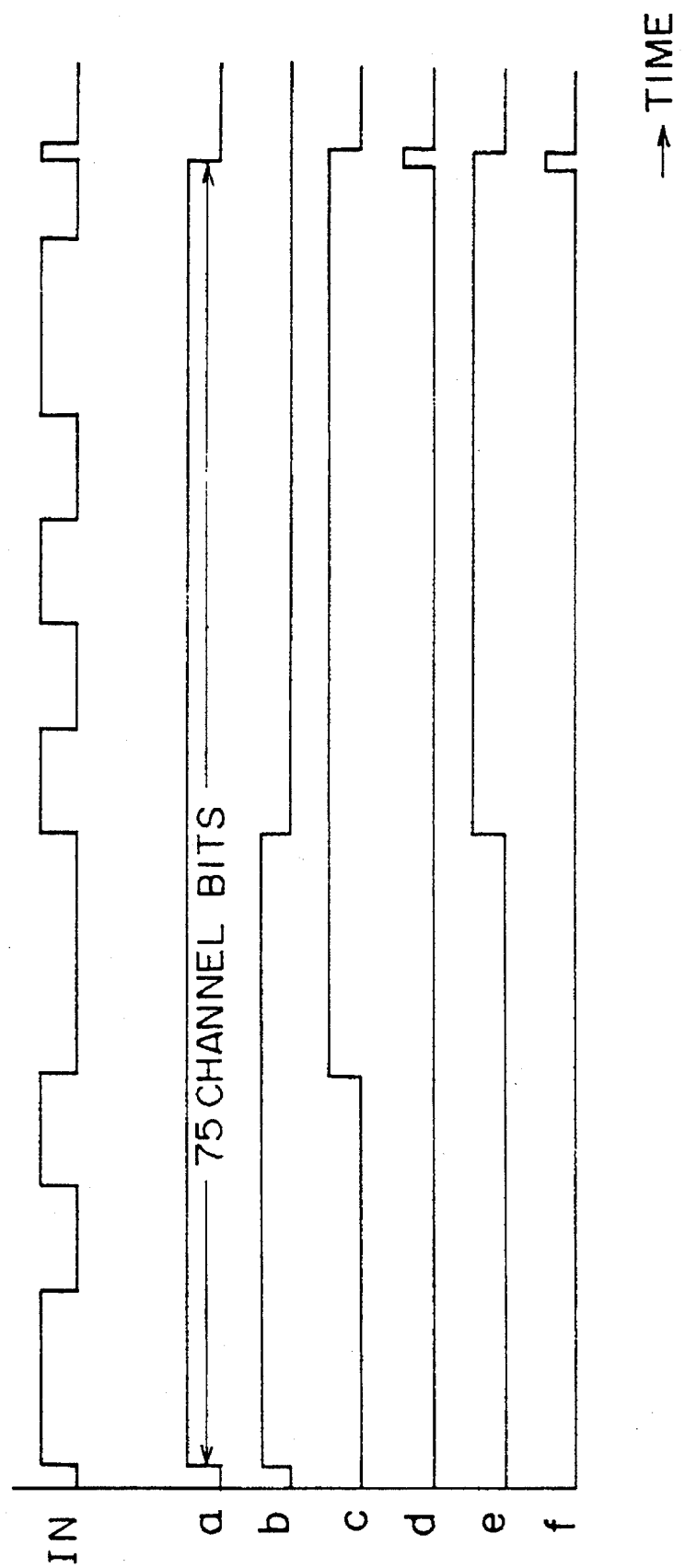
FIG. 4 is a time chart for explaining the operation of the sector mark detection apparatus shown in FIG. 3.

FIG. 4 shows a time chart for explaining the operation of this embodiment. The input signal (pulse signal) IN which is read from the optical disk is supplied to the ring counter 22 which successively generates a timing signal between pulses in senary. This timing signal is supplied to the gate signal generating circuit 23 which generates a predetermined number of gate signals including gate signals "a" and "b" based on the timing signal.

The gate signal corresponds to the entire length of the mark which characterizes a sector mark signal or corresponds to an interval close to the entire length of the mark, and is generated between the rising edges of the input signal IN. For example, the gate signal "a" corresponds to the signal (75 channel bits) between 6 pulses (senary), and the gate signal "b" corresponds to the signal between 3 pulses.

On the other hand, the mark length generating circuit 24 detects the mark length based on the input signal IN and the senary timing signal in response to the clock CLK, and supplies a mark length datum "c" to the judging circuit 28 based on the detected mark length. This mark length datum "c" is used in the judging circuit 28 to exclude those sector marks having different bit data.

The ON or high-level periods of the gate signals "a" and "b" are counted in the counter circuit 25 which counts the clock CLK which has a predetermined frequency which is necessary and sufficient. The counted values in the counter circuit 25 are supplied to the pattern matching circuit 26 which determines whether or not these counted values match the predetermined patterns of the match data which are supplied from the match data generating circuit 27. Matching values "d" and "e" which are indicative of the results of the matching are supplied from the pattern matching circuit 26 to the judging circuit 28.

The judging circuit 28 outputs a sector mark detection signal "f" if the data of the matching values "d" and "e" relate to the sector marks and match the bit rate of the mark length datum "c".

Accordingly, it becomes possible to detect the sector marks of the zones in which the bit rate is two times the minimum bit rate of the MCAV system optical disk with a resolution which is 2% or less using the clock CLK having a frequency which is two times the minimum bit rate.

Figure 5:
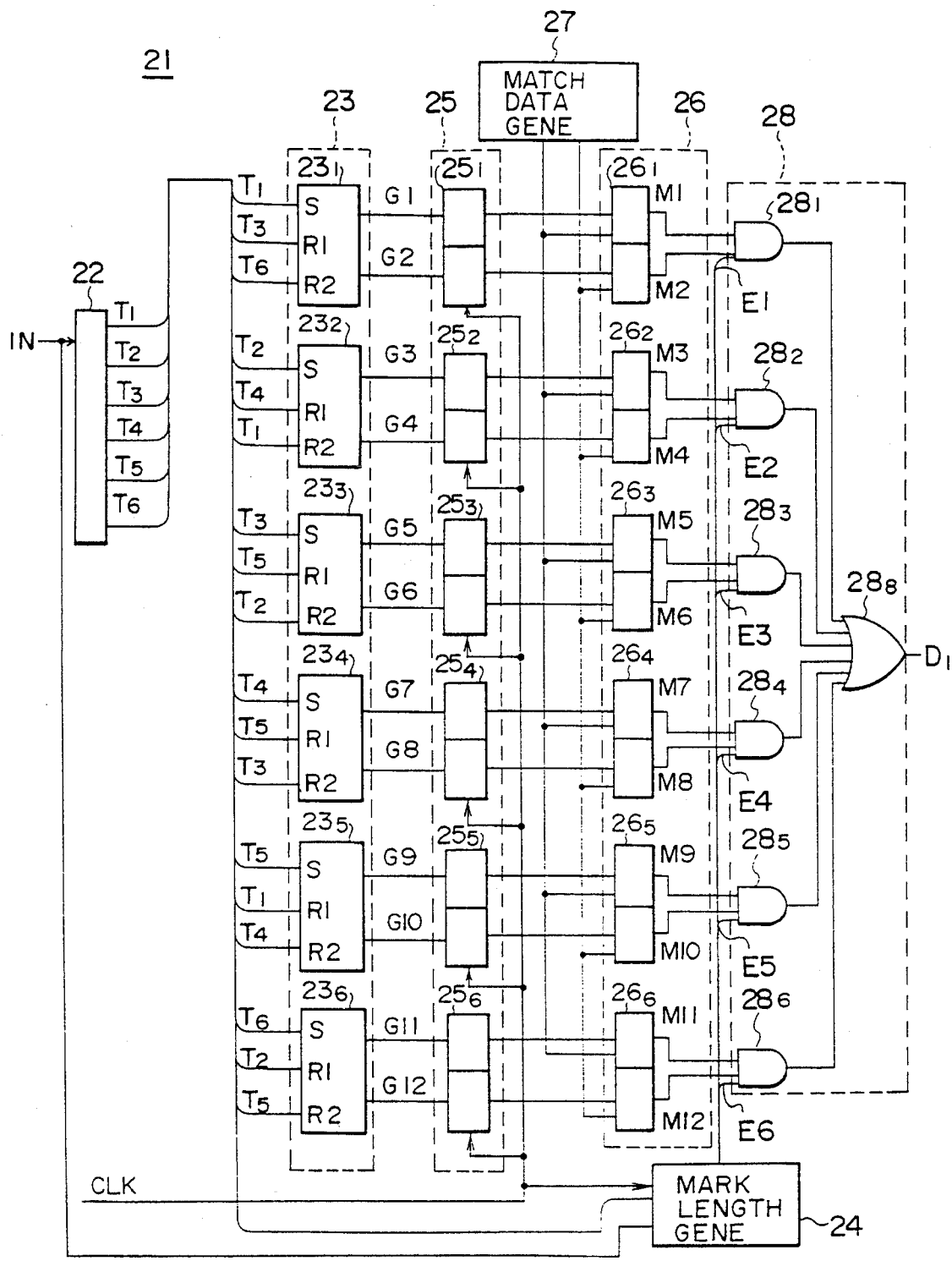
FIG. 5 is a circuit diagram showing the construction of the embodiment of the sector mark detection apparatus in mode detail.

Next, FIG. 5 shows the construction of this embodiment in more detail. In the sector mark detection apparatus 21 shown in FIG. 5, the senary ring counter 22 generates timing signals T1 through T6 based on the input signal IN which is a repetition of signals IN1 through IN6 in the case of senary. The timing signals T1 through T6 are supplied to the gate signal generating circuit 23 and the mark length generating circuit 24. The gate signal generating circuit 23 includes gate circuits $23_1$ through $23_6$. In this case, the timing signals T1, T3 and T6 are supplied to the gate circuit $23_1$, the timing signals T2, T4 and T1 are supplied to the gate circuit $23_2$, the timing signals T3, T5 and T2 are supplied to the gate circuit $23_3$, the timing signals T4, T6 and T3 are supplied to the gate circuit $23_4$, the timing signals T5, T1 and T4 are supplied to the gate circuit $23_5$, and the timing signals T6, T2 and T5 are supplied to the gate circuit $23_6$. Of course, the number and location of gate circuits are not limited to those shown in FIG. 5 as long as the sector marks are detectable and can be distinguished from each other.

The counter circuit 25 includes counters $25_1$ through $25_6$. Gate signals G1 and G2 output from the gate circuit $23_1$ are supplied to the counter $25_1$, gate signals G3 and G3 output from the gate circuit $23_2$ are supplied to the counter $25_2$, and gate signals G5 and G6 output from the gate circuit $23_3$ are supplied to the counter $25_3$. Similarly, gate signals G7 and G8 output from the gate circuit $23_4$ are supplied to the counter $25_4$, gate signals G9 and G10 output from the gate circuit $23_5$ are supplied to the counter $25_5$, and gate signals G11 and G12 output from the gate circuit $23_6$ are supplied to the counter $25_6$. In addition, the clock CLK having a frequency which is two times the minimum bit rate of the optical disk is input to each of the counters $25_1$ through $25_6$.

Counted value signals output from the counters $25_1$ through $25_6$ and indicative of the respective counted values are supplied to corresponding comparators $26_1$ through $26_6$ of the pattern matching circuit 26. In addition, the comparators $26_1$ through $26_6$ also receive matching data signals which correspond to the counted value signals and are appropriately changed in the match data generating circuit 27. The match data generating circuit 27 freely changes the matching data signal because this embodiment employs the MCAV system optical disk.

Matching value signals M1 through M12 which are output from the comparators $26_1$ through $26_6$ are supplied to corresponding AND circuits $28_1$ through $28_6$ of the judging circuit 28. In addition, the AND circuits $28_1$ through $28_6$ also receive corresponding mark length data signals E1 through E6 which are generated in the mark length generating circuit 24 by sampling the input signal IN and the timing signals T1 through T6 by the clock CLK. Outputs of the AND circuits $28_1$ through $28_6$ are supplied to an OR circuit $28_8$ of the judging circuit 28, and this OR circuit $28_8$ outputs the sector mark detection signal "f".

Figure 6:
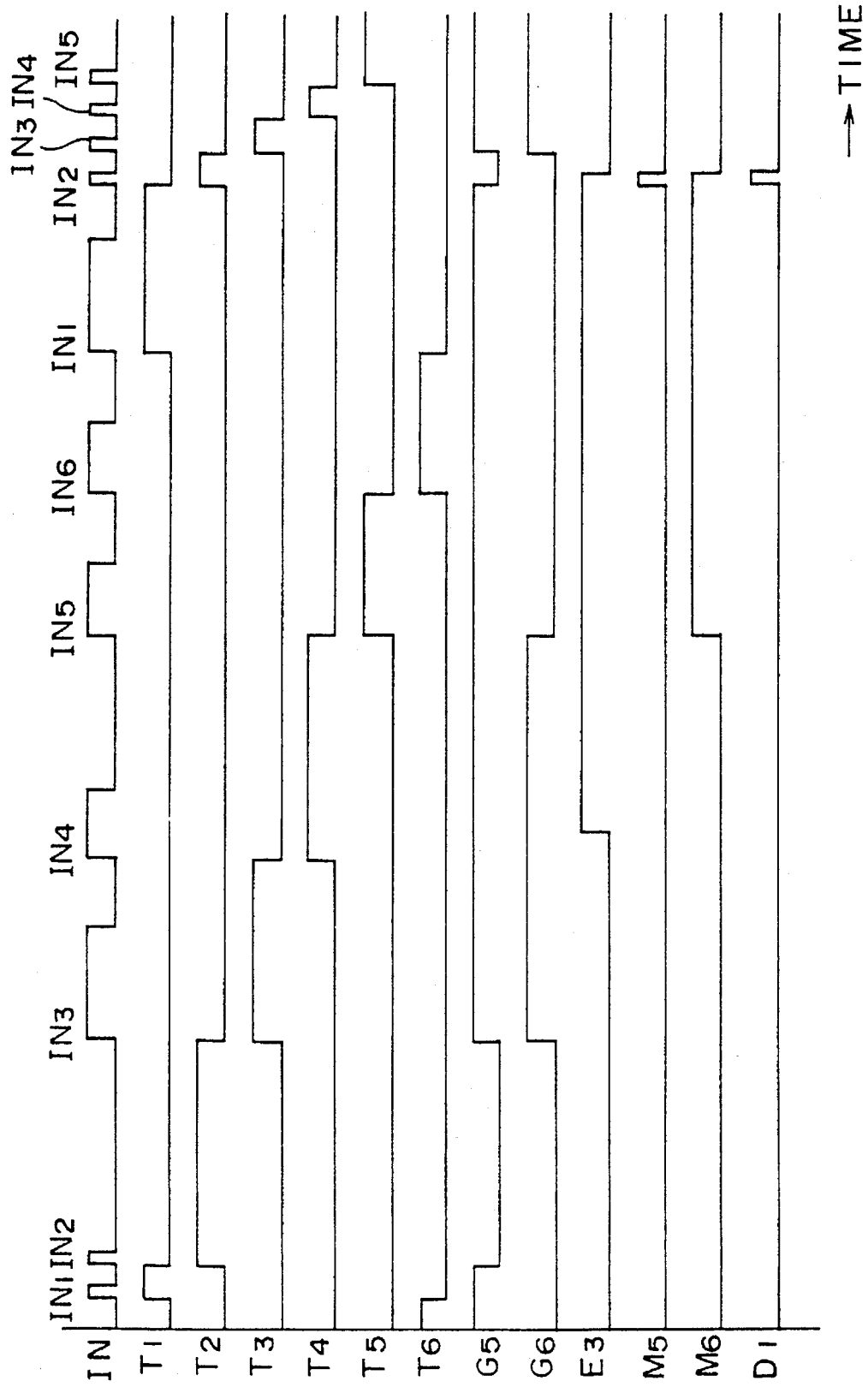
FIG. 6 is a time chart for explaining the operation of the sector mark detection apparatus shown in FIG. 5.

FIG. 6 is a time chart for explaining the operation of the sector mark detection apparatus 21 shown in FIG. 5. In FIG. 6, it is assumed for the sake of convenience that the sector mark is detected by the AND circuit $28_3$ of the judging circuit 28.

In FIG. 6, when the input signal IN read from the optical disk is input to the senary ring counter 22 as a clock, the ring counter 22 generates the timing signals T1 through T6 having phases which are shifted by one clock at the timings of all phases. The gate signal generating circuit 23 generates the gate signals G1 through G12 based on the timing signals T1 through T6.

The gate circuit $23_3$ generates the gate signals G5 and G6 using the timing signals T3, T5 and T2. The gate signal G5 rises at the rising edge of the timing signal T3, and falls at the rising edge of the next timing signal T2. In addition, the gate signal G6 rises at the rising edge of the timing signal T3, and falls at the rising edge of the timing signal T5.

If the counted values obtained in the counter circuit 25 by counting the clock CLK during the ON (or high-level) periods of the gate signals G1 through G12 and the values of the match data generated by the match data generating circuit 27 match in the pattern matching circuit 26, the pattern matching circuit 26 outputs matching signals M1 through M12. Hence, if the values match in the comparator $26_3$, the levels of the matching signals M5 and M6 become high at the next timing signal T2.

On the other hand, if a pulse width T of the input signal IN1 is taken as a reference, the mark length generating circuit 24 generates mark length data E1 through E6 at a timing when two or more pulse signals having the high-level state for a time of 3T or more is detected from the input signal IN (IN1 through IN6). The threshold value used in the mark length generating circuit 24 is freely set depending on the dynamic range of the data rate of the MCAV system optical disk. In this case, the mark length datum E3 rises at the rising edge of the input signal IN4, and falls at the falling edge of the next input signal IN2.

Accordingly, in the judging circuit 28, the OR circuit $28_8$ outputs a sector mark detection signal D1 if the matching signals M1 through M12 and the mark length data E1 through E6 both have the high level. In this case, only the output of the AND circuit $28_3$ has the high level, and the outputs of the other AND circuits have the low level. In other words, the sector marks can be detected regardless of the phase of the input signal IN if all of the necessary conditions for the matching signals M1 through M12 and the mark length data E1 through E6 are satisfied.

For example, if this embodiment is applied to the MCAV system optical disk having 25 to 48 sectors per track, it becomes possible to detect the sector marks within all of the zones and to distinguish the zones by the matching data using a clock frequency 29 MHz which is two times the data rate 14.5 MHz/3000 rpm of 25 sectors/track. That is, it becomes possible to detect the sector marks of the zones in which the bit rate is two times the minimum bit rate of the MCAV system optical disk with a resolution which is 2% or less using the clock CLK having a frequency which is two times the minimum bit rate.

Although the sector mark detection apparatus according to the present invention is applied to the MCAV system optical disk in the embodiment described above, the sector mark detection apparatus according to the present invention is of course similarly applicable to a MCVL (Modified Constant Linear Velocity) system optical disk or the like.

According to this embodiment, the widths of the gate signals which are generated from the input signal read from the optical disk are measured by counting at a predetermined frequency, and the sector marks are distinguished based on a comparison of the counted values and the matching data. As a result, it is possible to detect the sector marks with a high resolution using a simple construction and a low frequency signal.

Various kinds of recording formats have been proposed in order to obtain a large memory capacity with the optical disk and to record the information at a target address and reproduce the information with a high reliability. As techniques for arranging the sectors, there are the CLV (Constant linear velocity) system, the CAV (Constant Angular Velocity) system, the MCLV (Modified CLV) system and the MCAV (Modified CAV) system.

The linear velocity of the optical disk is kept constant in the case of the CLV system, and the angular velocity of the optical disk is kept constant in the case of the CAV system. The MCLV system simplifies the variable speed control of a spindle motor in the CLV system, and the MCAV system increases the memory capacity in the CAV system.

Because the CAV system optical disk has the same number of sectors per track from the inner periphery to the outer periphery of the optical disk, a CAV system disk drive samples the signal read from the optical disk using a predetermined read reference clock. Hence, the information recording and reproduction are carried out by locking the clock using a phase locked loop (PLL) or the like after detecting the sector mark which is added to the head of each sector.

Figure 7:
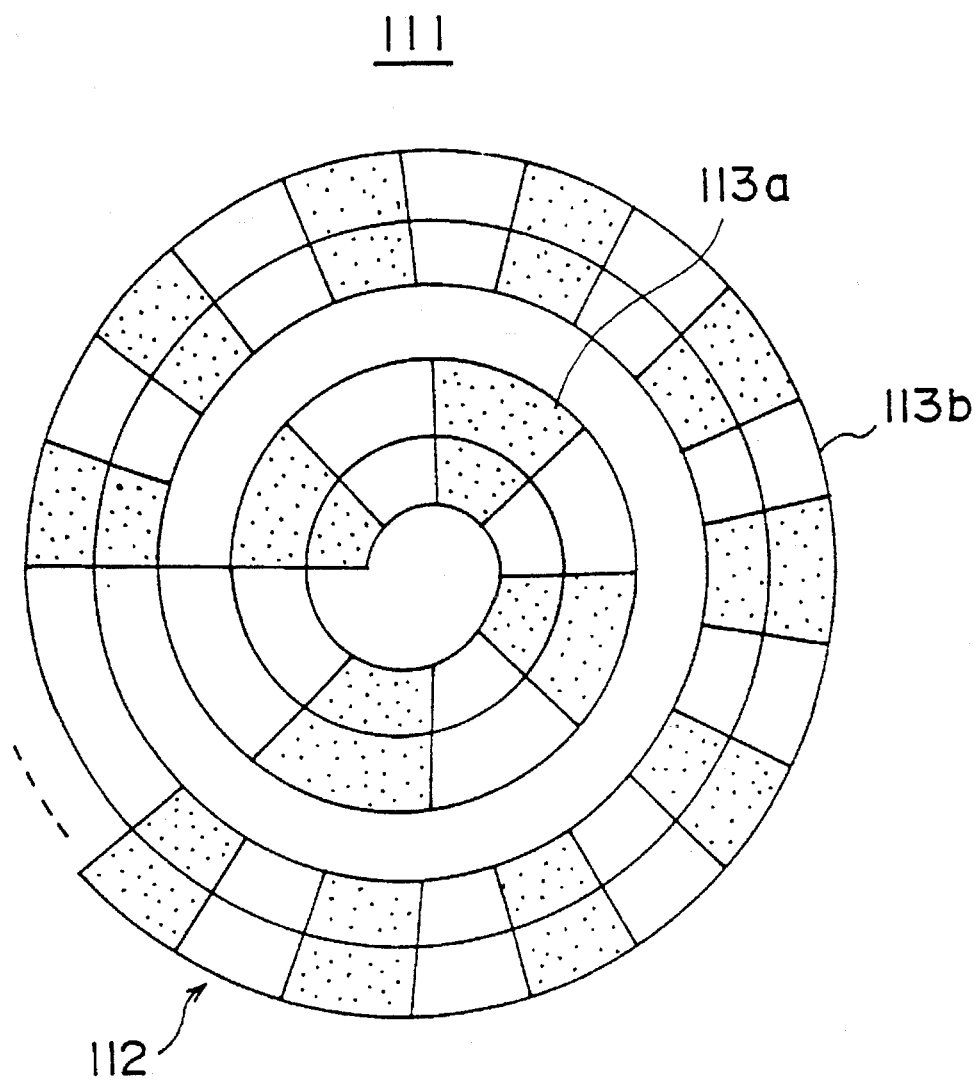
FIG. 7 is a diagram for explaining a recording format of a conventional optical disk employing the MCAV system.

On the other hand, FIG. 7 is a diagram for explaining the recording format of the conventional MCAV system optical disk. FIG. 7 shows the sector arrangement of an optical disk 111 which is formatted according to the MCAV system. A spiral track 112 is formed on this optical disk 111, and the sectors are arranged so that the number of sectors differs depending on zones 113a, 113b, . . . Several to several tens of zones exist from the inner periphery to the outer periphery of the optical disk 111. Accordingly, the reference clock used for the recording and reproduction differs depending on the zone, and the reference clock frequency becomes higher towards the outer periphery of the optical disk 111.

Hence, in order to start a CAV system disk drive using the MCAV system optical disk such as that shown in FIG. 7, a head is moved to a predetermined position on the optical disk and the recording or reproduction is carried out from a known zone of the optical disk. The starting of the disk drive refers to a series of operations in which the head is moved to the predetermined position on the optical disk and the rotational speed of the optical disk is controlled to a rotational speed which conforms to the sector position.

As other methods of starting the disk drive, there is a first method of varying the rotational speed of the MCAV system optical disk and starting the recording or reproduction from a position where a recording frequency of the optical disk matches a read reference clock frequency used in the disk drive, and a second method of keeping the rotational speed of the optical disk fixed and varying the read reference clock frequency, so as to start the recording or reproduction from a position where the recording frequency of the optical disk matches the read reference clock frequency used in the disk drive.

However, according to the first method, a position detecting mechanism is required in order to move the head to the predetermined position. As a result, there are problems in that the position detecting mechanism must be extremely accurate and thus have a complex construction particularly if a large number of zones exist on the optical disk.

On the other hand, according to the second method, it takes time to vary the rotational speed or the reference clock frequency. For this reason, there is a problem in that the disk drive cannot be started quickly.

Accordingly, a description will next be given of an optical disk access apparatus which can reduce the start time of the disk drive using a simple construction.

Figure 8:
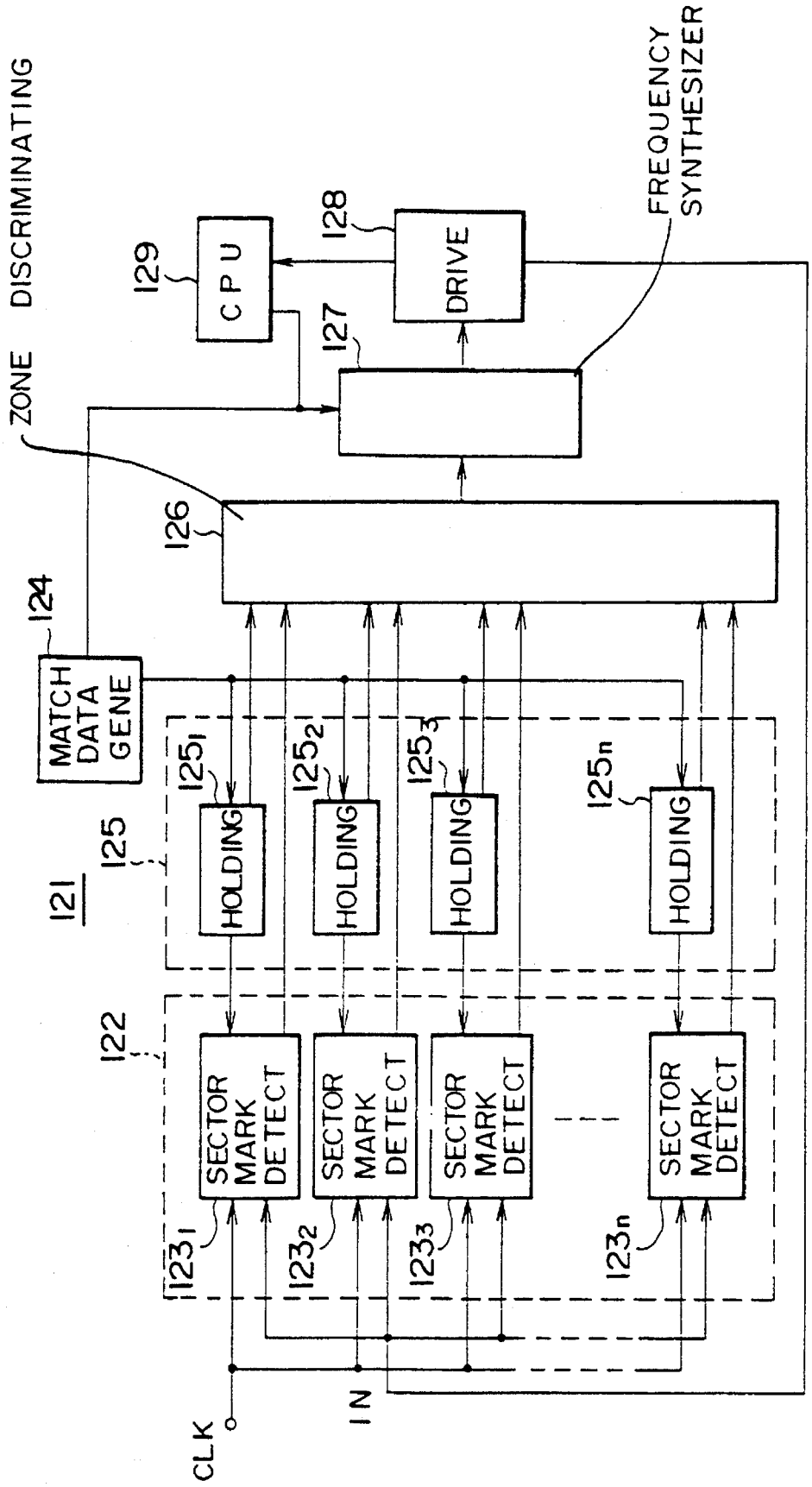
FIG. 8 is a system block diagram showing a first embodiment of an optical disk access apparatus according to the present invention.

FIG. 8 shows a first embodiment of the optical disk access apparatus according to the present invention. In this embodiment, the optical disk used is a MCAV system optical disk such as that shown in FIG. 7. Hence, the optical disk has n zones (or regions), a sector mark is added to each of the sectors, and the number of sectors differs depending on the zone.

In FIG. 8, a sector detection apparatus 121 includes a sector mark detector 122 which is made up of sector mark detection circuits $123_1$ through $123_n$ which are arranged in parallel with respect to each of the zones of the optical disk (not shown). Each of the sector mark detection circuits $123_1$ through $123_n$ receive a sampling clock CLK and an input signal IN which is read from the optical disk.

A match data generating circuit 124 of the sector detection apparatus 121 generates match data corresponding to the sector marks added to the sectors in each of the zones of the optical disk. n match data corresponding to the n zones are respectively held in match data holding circuits $125_1$ through $125_n$ which form a match data holding part 125 of the sector detection apparatus 121. The n match data from the match data holding circuits $125_1$ through $125_n$ are supplied to the corresponding sector mark detection circuits $123_1$ through $123_n$. These match data generating circuit 124 and the match data holding part 125 form a holding means.

Each of the sector mark detection circuits $123_1$ through $123_n$ detect the sector marks and compares the detected sector marks with the corresponding match data. Results of the comparisons are supplied from the sector mark detection circuits $123_1$ through $123_n$ to a zone discriminating circuit 126 of the sector detection apparatus 121. The zone discriminating circuit 126 discriminates the zone from each of the comparison results and each of the match data. A result of the discrimination is supplied to a frequency synthesizer 127 of the sector detection apparatus 121. This frequency synthesizer 127 forms a frequency generating means.

The frequency synthesizer 127 supplies to a drive part 128 a reference clock having a frequency corresponding to the discriminated zone. The drive part 128 of the sector detection apparatus 121 carries out the recording or reproduction based on the reference clock. The drive part 128 has a known construction including a means for rotating the optical disk and a means for recording and reproducing information on and from the rotating optical disk. The matching data generating circuit 124 and the frequency synthesizer 127 obtain information from a central processing unit (CPU) 129 of the sector detection apparatus 121 if necessary, and address information and the like are supplied from the drive part 128 to the CPU 129.

Hence, in the sector detection apparatus 121, the sector mark detection circuits $123_1$ through $123_n$ of the sector detector 122 sample the input signal IN by the clock CLK, or count (or measure) the lengths of the entire sector mark and portions thereof. The sector mark detection circuits $123_1$ through $123_n$ also compare the sampled patterns or the counted values with the corresponding match data so as to detect the sector marks, and supply the results of the comparisons to the zone discriminating circuit 128 in the form of sector mark signals.

The zone discriminating circuit 126 discriminates the zones from the sector mark signals and the match data, and supplies the discrimination result to the frequency synthesizer 127 so that the frequency synthesizer 127 generates a frequency depending on the information included in the discrimination result. Alternatively, the zone discriminating circuit 126 switches the frequency generated from the frequency synthesizer 127 to a fixed frequency. Therefore, the drive part 128 carries out the recording or reproduction based on the frequency generated from the frequency synthesizer 127.

Figure 9:
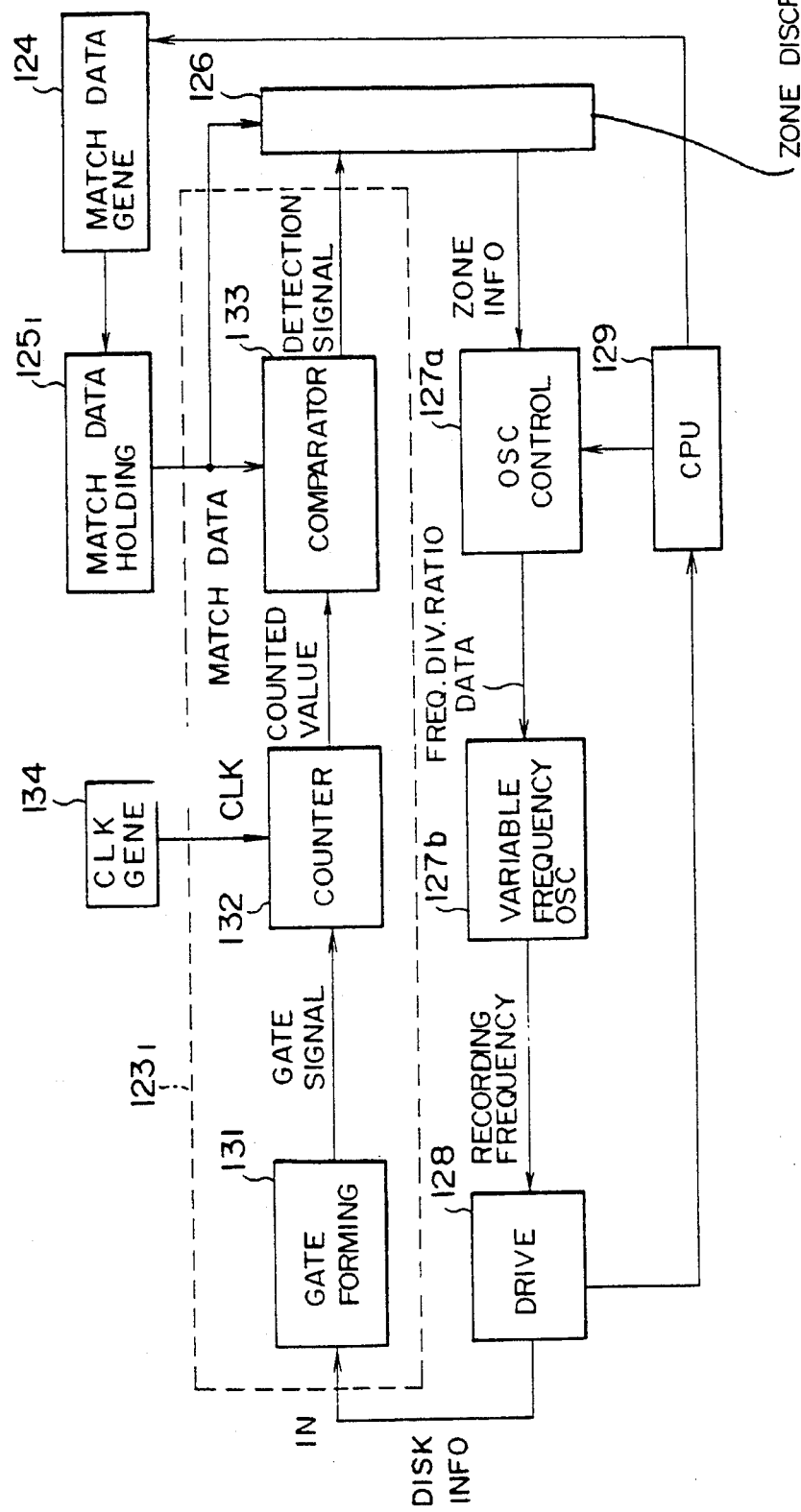
FIG. 9 is a system block diagram showing the construction of a detection system corresponding to one zone in the optical disk access apparatus shown in FIG. 8.

FIG. 9 shows a detection system corresponding to 1 zone in the first embodiment shown in FIG. 8. FIG. 9 is a system block diagram for explaining the typical construction and operation related to the sector mark detection circuit $123_1$ shown in FIG. 8. As shown in FIG. 9, the sector mark detection circuit $123_1$ includes a gate forming circuit 131, a counter 132, and a matching value comparator circuit 133.

The input signal IN which is read from the optical disk by the drive part 128 is input to the gate forming circuit 131. A sampling clock CLK from a clock generator 134 is input to the counter 132. In addition, a match datum from the match data holding circuit 125$_1$ is input to the matching value comparator circuit 133. The frequency synthesizer 127 is made up of an oscillator control circuit 127a and a variable frequency oscillator 127b. Since there are n zones in the optical disk, the n sector mark detection circuits having the above described construction are provided in this embodiment.

Next, the operation of this embodiment will be given for one zone of the optical disk. First, the CPU 129 supplies a start signal to the match data generating circuit 124. The match data holding circuit 125$_1$ within the match data holding part 125 and corresponding to a first zone holds the match data from the match data generating circuit 124.

Then, based on the input signal IN which is read from the optical disk and output from the drive part 128, the gate forming circuit 131 of the sector mark detection circuit 123$_1$ generates a gate signal corresponding to the lengths of the entire sector mark and portions thereof. This gate signal from the gate forming circuit 131 is supplied to the counter 132. The counter 132 counts the clock CLK from the clock generator 134 depending on the gate signal, and supplies the counted value to the matching comparator circuit 133.

The matching comparator circuit 133 compares the counted value and the match data received via the match data holding circuit 125$_1$, so as to determine whether the compared values match. In other words, out of the n sector mark detection circuits 123$_1$ through 123$_n$ shown in FIG. 8, the compared values match in only one sector mark detection circuit. Hence, if the compared values match for example in the sector mark detection circuit 123$_1$ shown in FIG. 9, only this sector mark detection circuit 123$_1$ supplies a sector mark detection signal to the zone discriminating circuit 126.

The zone discriminating circuit 126 supplies to the oscillator control circuit 127a of the frequency synthesizer 127 zone information related to the corresponding zone based on the sector mark detection signal and the match data received via the match data holding circuit 125$_1$. The oscillator control circuit 127a outputs a frequency dividing ratio datum based on the zone information, and the variable frequency oscillator 127b supplies a frequency signal to the drive part 128 and controls the drive part 128 based on the frequency dividing ratio datum, so that the recording or reproducing frequency of the optical disk becomes the recording frequency of this zone.

Hence, the drive part 128 detects the address recorded in the sector at the recording frequency. If the address is detected, it is found that the recording frequency is correct. In this case, the drive part 128 supplies to the CPU 129 an address detection signal for fixing the recording frequency. The CPU 129 controls the oscillator control circuit 127a based on the address detection signal so as to generate a predetermined frequency from the variable frequency oscillator 127b.

Therefore, even if the sector mark is erroneously detected, it is possible to always supply the recording frequency of the zone to the drive part 128 by the feedback of the address detection signal. In addition, even when the zone changes, it is possible to quickly generate the next recording frequency.

Because the match datum is prepared for each zone, it is possible to start the drive part 128 from any zone using a simple construction, and the start time of the drive part 128 can be reduced compared to the conventional case.

Figure 10:
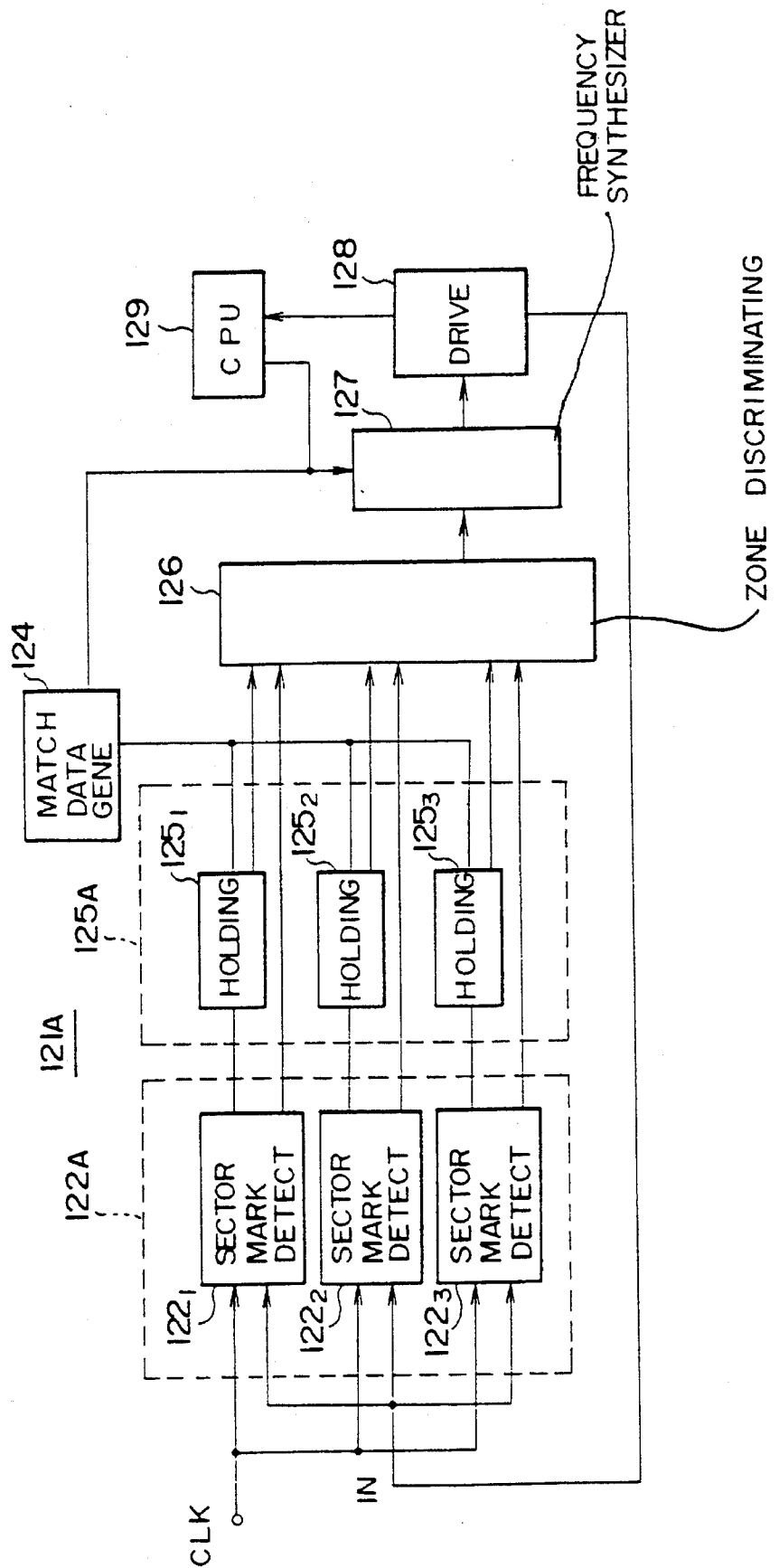
FIG. 10 is a system block diagram showing a second embodiment of the optical disk access apparatus according to the present invention.

Next, a description will be given of a second embodiment of an optical disk access apparatus according to the present invention, by referring to FIG. 10. In FIG. 10, those parts which are the same as those corresponding parts in FIG. 8 are designated by the same reference numerals, and a description thereof will be omitted.

A sector detection apparatus 121A shown in FIG. 10 includes a sector mark detector 122A which is made up of 3 sector mark detection circuits 122$_1$ through 122$_3$, and a match data holding part 125A which is made up of 3 match data holding circuits 125$_1$ through 125$_3$. Otherwise, the construction of the sector detection apparatus 121A is the same as the sector detection apparatus 121 shown in FIGS. 8 and 9.

In the sector detection apparatus 121A shown in FIG. 10, the match data generating circuit 124 generates the match data amounting to 3 zones in response to a start signal from the CPU 129, and the match data are held in the match data holding circuits 125$_1$ through 125$_3$. If the address detection signal is not output from the drive part 128 after a predetermined time, the match data generating circuit 124 generates the match data amounting to the next 3 zones and the match data are held in the match data holding circuits 125$_1$ through 125$_3$. The operation of holding the match data corresponding to the next 3 zones is repeated until the address is detected and the address detection signal is output from the drive part 128.

In this embodiment, the match data corresponding to 3 zones are held in the match data holding part 125A because in this case it is possible to hold at the time of the seek operation the match data corresponding to a certain zone in which the target track exists and the match data corresponding to zones which are adjacent to the certain zone. As a result, even if the seek operation erroneously ends in the adjacent zone, it is possible to quickly detect the address using the held match data corresponding to the certain zone in which the target track exists.

In this embodiment, the sector detection circuit 121A requires more time to detect the sector mark compared to the sector detection circuit 121 of the first embodiment shown in FIG. 8. However, the second embodiment is still quick in terms of starting the drive compared to the conventional case where only one match datum is provided. In addition, even if the target track is overrun at during the seek operation and the next zone is reached or the zone in which the target track exists is not reached during the seek operation, it is possible to quickly read the address.

Furthermore, the construction of the sector mark detection circuit is not limited to that shown in FIG. 9, and the construction shown in FIG. 3 or FIG. 5, for example, may also be used.

In the first and second embodiments of the optical disk access apparatus< the holding means is formed by the match data generating circuit 124 and the match data holding part 125 or 125A. However, it is possible to use a recording medium such as a CD-ROM (Compact Disk Read Only Memory) which prestores the match data and obtain the same effects.

According to the first and second embodiments of the optical disk access apparatus, the match data corresponding to the sector marks of each of the zones are held for each of the zones, and the sector marks are detected by comparing the signal read from the optical disk and the match data of each of the zones. In addition, the zones are discriminated based on the detected sector marks, and the recording or reproducing operation of the drive is started by a clock frequency of the discriminated zone. Hence, it is possible to simultaneously detect the sector mark and discriminate the zone. Therefore, it is possible to reduce the access time to a desired position of the optical disk using a simple construction.

Further, the present invention is not limited to these embodiments, but various variations and modifications may be made without departing from the scope of the present invention.

What is claimed is:

1. A sector mark detection apparatus which detects a sector mark added to an arbitrary sector of an optical disk when seeking the arbitrary sector, said optical disk having a predetermined recording format in which a predetermined number of sectors are arranged on the optical disk, said sector mark detection apparatus comprising:

gate signal generating means for generating a predetermined number of gate signals at predetermined intervals based on timings between pulse signals which are read from the optical disk;

mark length generating means, coupled to said gate signal generating means, for generating mark length data related to lengths of the sector marks from the read pulse signals based on said timings;

counter means, coupled to said gate signal generating means, for measuring widths of the gate signals by counting at a predetermined frequency and for outputting counted values;

matching means, coupled to said counter means, for comparing the counted values and match data and for outputting a matched result; and judging means, coupled to said matching means, for judging the sector mark of the arbitrary sector based on the mark length data and the matching result.

2. The sector mark detection apparatus as claimed in claim 1, wherein said gate signal generating means includes:

a ring counter generating timing signals corresponding to the timings between the pulse signals read from the optical disk based on the pulse signals; and a gate signal generating circuit generating the gate signals based on the timing signals.

3. The sector mark detection apparatus as claimed in claim 1, wherein said matching means includes a match data generating circuit generating the match data corresponding to the sector marks for each of zones of the optical disk.

4. The sector mark detection apparatus as claimed in claim 1, wherein said judging means judges that the sector mark of the arbitrary sector has been detected if a datum of the matching result is related to the arbitrary sector and matches a bit rate indicated by the mark length data.

5. The sector mark detection apparatus as claimed in claim 1, wherein the optical disk has a recording format in conformance with a MCAV (Modified Constant Angular Velocity) system.

\* \* \* \* \*